United States Patent [19]

Schlüter

[11] Patent Number: 4,789,250

[45] Date of Patent: Dec. 6, 1988

[54] THRUST BEARING OR AXIAL JOURNAL BEARING, IN PARTICULAR FOR SLOW-RUNNING MACHINES

[75] Inventor: Siegfried Schlüter, Wenden, Fed. Rep. of Germany

[73] Assignee: Apparatebau Rothemühle Brandt & Kritzler GmbH, Rothemuhle, Fed. Rep. of Germany

[21] Appl. No.: 62,114

[22] Filed: Jun. 12, 1987

[30] Foreign Application Priority Data

Jun. 12, 1986 [DE] Fed. Rep. of Germany ....... 3619828

[51] Int. Cl.$^4$ .............................................. F16C 17/04
[52] U.S. Cl. ..................................................... 384/305
[58] Field of Search ............... 384/305, 123, 292, 291, 384/112, 306, 307, 308

[56] References Cited

U.S. PATENT DOCUMENTS

| | | | |
|---|---|---|---|
| 1,674,453 | 6/1928 | Sloper | 384/292 |
| 2,067,034 | 1/1937 | Whiteley | 384/292 |
| 2,362,667 | 11/1944 | Schmidt | 384/305 |
| 4,620,803 | 11/1986 | Veziriana | 384/93 |

FOREIGN PATENT DOCUMENTS

| | | |
|---|---|---|
| 487677 | 12/1929 | Fed. Rep. of Germany . |
| 971722 | 3/1959 | Fed. Rep. of Germany . |
| 518923 | 6/1921 | France . |
| 297875 | 10/1928 | United Kingdom . |
| 1068448 | 5/1967 | United Kingdom . |

OTHER PUBLICATIONS

Patent Abstracts of Japan, Band 10, Nr. 193 (Jul. 8, 1986).

*Primary Examiner*—Lenard A. Footland
*Attorney, Agent, or Firm*—Toren, McGeady & Associates

[57] ABSTRACT

A thrust or journal bearing which is suitable for use in particular in slow-running machines is intended to have as large as possible a bearing surface with a minimum diameter and at the same time to have optimal running properties and long life in normal operation, as well as good emergency running properties in the event of oil deficiency. Here a base body 2, e.g. a ring or a ring sector, bears sliding shoes 3 disposed in a uniform distribution peripherally and radially, on which is supported a plant bearing surface above a supporting film of lubricant. The sliding shoes 3 have an outline at least approximating to that of a square and are located congruently to each other on predetermined pitch circles $d_0$, $d_1$, $d_2$ ... $d_x$ of the base body 2. The side length of the sliding shoes 3 increases from the interior to the exterior proportionately to the increase in the pitch circle diameter $d_0$, $d_1$, $d_2$ ... $d_x$ and the adjacent sliding shoes 3 are in each case delimited from each other by fluted or grooved profiles 7, 7', 7". Two groups 7' and 7" of fluted or grooved profiles 7 run spirally, and the directions of curvature of them are counter to each other. They are preferably in each case in the shape of a logarithmic spiral.

15 Claims, 1 Drawing Sheet

THRUST BEARING OR AXIAL JOURNAL BEARING, IN PARTICULAR FOR SLOW-RUNNING MACHINES

BACKGROUND OF THE INVENTION

1. Field of the Invention

The invention relates to a thrust bearing or axial journal bearing, in particular for slow-running machines, predominantly for the rotating hoods or the rotatable storage bodies of regenerative heat exchangers.

The invention relates particularly to large-area plain thrust bearings which can be subjected to high loads, which can also be operated in the field of mixed friction and in which a basic body, e.g. a ring or ring sector, bears sliding shoes uniformly disposed in a peripheral and possibly also in a radial direction, on which a plane bearing surface is supported.

2. Description of the Prior Art

Thrust bearings and axial journal bearings of this type are already known under the name "Wulfel RD thrust bearings", in which the sliding shoes have a round running surface and are supported, through the intermediary of cup springs, with limited possibility of tilting motion in bearing rings serving as support bodies. If necessary, a plurality of support rings bearing sliding shoes may also be disposed concentrically, one within the other in order to increase the size of the active bearing and running surfaces.

Similar thrust bearings or axial journal bearings in which a relatively large number of sliding shoes with round running surfaces are incorporated distributed over annular sections of the base bodies and in this case lie on pitch circles disposed concentrically one within another are, as so-called plug bearings, already also state of the art.

Thrust bearings and axial journal bearings of this type have proved to be satisfactory in practical use. It has been found, however, that in these thrust bearings and axial journal bearings of the prior art, on account of the circular shape of the sliding shoes, the ratio of the bearing surfaces to the intermediate spaces adjacent to them proves to be very unfavourable, so that when as large as possible a bearing running surface of the sliding shoes must be available this can be achieved only by correspondingly larger dimensions of the entire bearing diameter.

The invention is based on the problem of providing a thrust or journal bearing of the generic type in which a favourable ratio of the bearing running surfaces formed by the sliding shoes to the intermediate spaces adjacent to them is obtained without this causing any deterioration in running properties as compared with known designs, especially in the range of so-called mixed friction.

SUMMARY OF THE INVENTION

This problem is solved by the fact that the sliding shoes have a plan shape at least approximating to a square and are disposed congruently with each other on given pitch circles of the basic body, that the side length of the sliding shoes in the direction from the interior to the exterior increase proportionately to the increase in the pitch circle diameter, and that adjacent sliding shoes are in each case delimited from each other by furrowed or grooved profiles.

This design according to the invention of a thrust or journal bearing has the particular advantage that the ratio of the bearing running surfaces on the sliding shoes to the intermediate spaces adjacent to them in each case may lie in ranges between 75:25 and 90:10. From this it results again that thrust or journal bearings with a desirably large running surface proportion of the sliding shoes can be obtained with a relatively small overall diameter. The running surfaces of the bearing are formed by a plurality of sliding shoe elements which are indeed different in size, but congruent with each other, and have a high bearing proportion.

For optimal operation of the thrust bearing or journal bearing according to the invention, independently of the direction of rotation it is important, moreover, that furrowed or grooved profiles in two groups intersecting each other delimit the sliding shoes from each other.

In the simplest case, one group of fluted or grooved profiles runs straight and radially, while the other group of fluted or grooved profiles is composed of circles disposed concentrically one within another.

An embodiment of the thrust or journal bearing is preferably used according to the invention in which both groups of fluted or grooved profiles run at angles in relation to each other and delimit between them a sliding shoe of approximately rhombic outline.

An embodiment in which, according to the invention both groups of fluted or grooved profiles have a spirally curved course, their directions of curvature being opposite to each other, however, has proved to be particularly satisfactory. In this case the fluted or grooved profiles of both groups should have the shape of a logarithmic spiral. In this case a whole series of advantages is obtained.

The number of sliding shoes per pitch circle is here constant.

The diagonals of the various sliding shoes lie on the individual pitch circles or radii.

The delimiting lines of the sliding shoes or the fluted or grooved profiles run at all points at an angle of 45° in relation to the pitch circles or radii in each case and have at the points in question a radius of curvature corresponding to the radius in each case.

The delimiting lines of the sliding shoes or of the fluted or grooved profiles also run at an angle of 45° in relation to the tangents in each case.

The spiral shape of the fluted or grooved profiles, on the relative movement of the cooperating running surfaces not only ensures a regular delivery of lubricant to the bearing surfaces, but also ensures that abraded material which possibly occurs is passed by the shortest route from the region of the bearing surfaces into the fluted or grooved profiles. The geometrical symmetry of the sliding shoes makes it possible, moreover, for the thrust or journal bearing to be used independently of a preferred direction of rotation.

Thrust or journal bearings according to the invention require little maintenance, have a long life and even with a deficiency of lubricant have good emergency running properties and can even be operated unlubricated under similar operating conditions without any noteworthy abrasion occurring.

In a further embodiment of the invention, the sliding shoes can be fitted individually into the base body and protrude above the surface of it, the edge surfaces of the sliding shoes adjacent to each other delimiting between themselves and the side surface of the base body the fluted or grooved profiles.

The sliding shoes can be joined to the base body by a form-casting process.

However, the sliding shoes may also be integrally formed with the base body, the fluted or grooved profiles being produced by casting (form-casting) or by cutting, e.g. milling.

An important design characteristic of the thrust or journal bearing according to the invention finally lies in the fact that the width of the opening of the fluted or grooved profiles at the base body or between the sliding shoes in the direction from the interior to the exterior is proportional the side length of the adjacent sliding shoe in each case. This embodiment is also to the advantage of an optimal delivery of lubricant to the running surfaces as well as unimpeded, easy removal of abraded material from the active bearing region.

Further characteristics and advantages of the object of the invention are explained below in detail by means of a drawing.

DETAILED DESCRIPTION OF THE INVENTION

Figure 1:
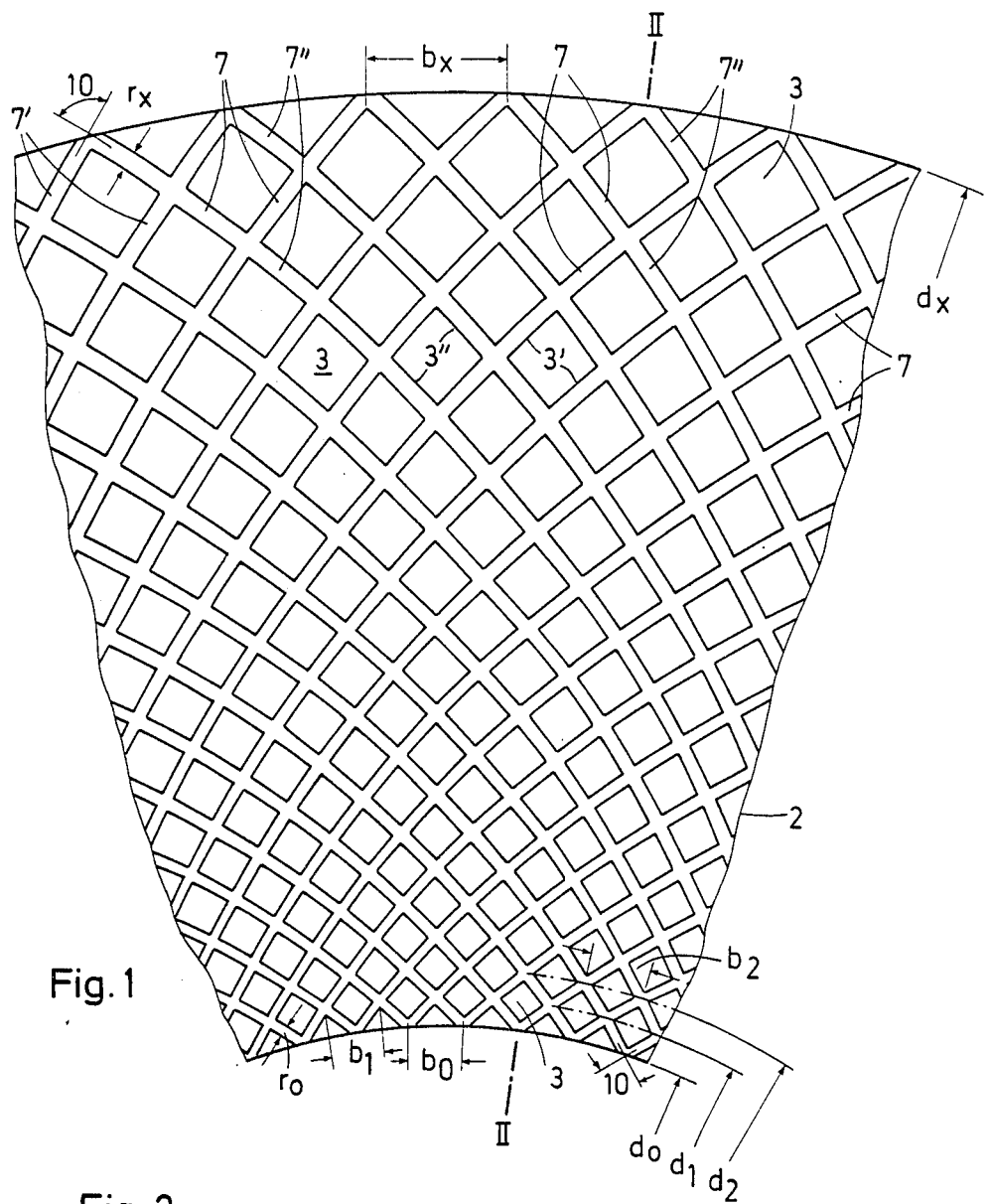
FIG. 1 shows a plan view of an area cut out of the base body, fitted with sliding shoes, of an annular thrust or journal bearing.

The thrust or journal bearing shown in the drawing is suitable in particular for use in slow-running machines and is intended preferably for use in conjunction with regenerative heat exchangers which are fitted either with gas feed cowls capable of rotation in relation to the fixed heat storage bodies and/or gas outlet cowls, or else have heat storage bodies disposed for rotation in relation to fixed gas feed and/or gas outlet cowls.

The thrust or journal bearing 1 has a base body 2 connected to one part of the machine and fitted with a plurality of sliding shoes 3, each of which has a plane running surface 4. The running surfaces 4 of these sliding shoes 3 are disposed at a distance 5 above the main plane 6 of the base body 2, which is shown in FIG. 2 by a dot-dash line.

Between the adjacent sliding shoes 3 fluted or grooved profiles 7 are kept free, the base surfaces of these lying at the level of main plane 6 of the base body.

Figure 2:
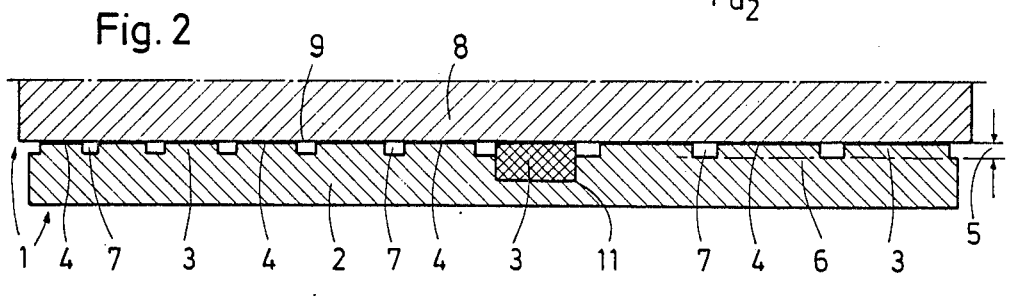
FIG. 2 shows a section along the line II—II in FIG. 1, a high-strength supporting disc with a plane bearing surface being associated with the base body which is fitted with the sliding shoes.

A high-strength supporting disc 8 cooperates by way of its bearing surface 9 with the running surfaces 4 of all sliding shoes 3 of the base body 2, as can be clearly seen from FIG. 2.

It can be seen, however, from FIG. 1 that all sliding shoes 3 on the base body 2 have an outline at least approximating to the shape of a square and are congruent with each other, lying on given pitch circles $d_0$, $d_1$, $d_2$, ... $d_x$.

It can also be seen from FIG. 1, however, that the size of the running surfaces of these sliding shoes 3 increases in the direction from the inner periphery (pitch circle $d_0$) to the outer periphery (pitch circle $d_x$) of the base body 2 as the pitch circle diameter becomes greater.

The individual sliding shoes 3 are delimited on the base body 2 by two groups 7' and 7" of fluted or grooved profiles 7 which are disposed so as to intersect with each other.

The two groups 7' and 7" of fluted or grooved profiles 7 run in each case at angles 10 in relation to each other which delimit between them sliding shoes 3 of approximately rhombic shape.

It is indeed feasible to provide for the fluted or grooved profiles 7 of the two groups 7' and 7" to run in a straight line over their entire length. It is particularly advisable, however, to design the fluted or grooved profiles 7 in such a way that both groups 7' and 7" of them have a spirally curved course and the directions of curvature of them are made opposite to each other. An optimal construction of the thrust or journal bearing 1 is achieved when the fluted or grooved profiles 7 of the two groups 7', 7" have in each case the shape of a logarithmic spiral, as is shown in FIG. 1 of the drawing.

With such a course of the fluted or grooved profiles are obtained, depending on the bearing diameter $d_0$, $d_1$, $d_2$, ... $d_x$ in each case and on the number of fluted or grooved profiles provided, rhombically delimited sliding shoes 3 of different sizes which are geometrically similar and can in each be assigned to a specific pitch circle diameter.

The number of sliding shoes 3 provided on each pitch circle $d_0$, $d_1$, $d_2$, ... $d_x$ is everywhere equal over the total periphery of the base body. The diagonals or intersection points of the fluted or grooved profiles 7 of the groups 7' and 7" which delimit the sliding shoes 3 lie in each case on the individual pitch circles and are located at distances of $b_0$, $b_1$, $b_2$, ... $b_x$ from each other which are proportional to the pitch circle diameter $d_0$, $d_1$, $d_2$, ... $d_x$.

The delimiting lines 3' and 3" of the individual sliding shoes 3 are at an angle of 45° to the pitch radii $d_0$, $d_1$, $d_2$, ... $d_x$ and also have at the same time at the points considered a radius of curvature corresponding to the pitch circle radius in each case. The delimiting lines 3' and 3" of the individual sliding shoes 3 also form in each case an angle of 45° with the tangents to the pitch circle $d_0$, $d_1$, $d_2$, ... $d_x$.

The distances $b_0$, $b_1$, $b_2$, ... $b_x$ between the intersection points or diagonals of the two groups 7' and 7" of fluted or grooved profiles 7 are based on the following relationships:

$$b_0 = d_0$$

$$b_1 = (d_0 + b_0)$$

$$b_2 = (d_0 + b_0 + b_1)$$

$$b_x = d_0 + (b_0 b_1 b_2 \ldots + b_x - 1).$$

The course of the fluted or grooved profiles 7 of the two groups 7' and 7" corresponding to a logarithmic spiral ensures that on the movement of the running surfaces 4 on the sliding shoes of the base body 2 in relation to the bearing surfaces 9 of the supporting disc 8 there is a regular delivery of lubricant, independently of the direction of rotation concerned. At the same time it is ensured that abraded material which possibly occurs passes by the shortest route out of the region of the bearing surfaces 4 and the bearing surfaces 9 into the region of the fluted or grooved profiles 7 and is removed from there.

It is also useful for optimal transport of lubricant that the width of the opening of the fluted or grooved profile 7 on the base body 2 between adjacent sliding shoes increases in the direction from the inside diameter $d_0$ to the outside diameter $d_x$ proportionally to the surface area of the adjacent sliding shoe 3 in each case, so that the smallest width $r_0$ of the fluted or grooved profile 7 is associated with the inside periphery of the base body 2, while the largest opening width $r_x$ is in the region of the outside periphery of it.

It is also important for the removal of the abraded material that collects in the fluted or grooved profiles 7 that the fluted or grooved profiles 7 widen constantly from the inside periphery towards the outside periphery of the base body 3.

It is clear that through the completely uniform distribution of the sliding shoes 3 over the entire surface area of the base body 2 optimal bearing properties are imparted which are also effective in the working region of so-called mixed friction with the least possible abrasion with a low surface load, and thus have long lives and still have good running properties even in the event of a lubricant deficiency. The thrust or journal bearings 1 may have a single annular or circular base body. They may, however, also be formed by a juxtaposition of equal annular or circular sectors disposed one below the other.

It can be seen from FIG. 2 that the sliding shoes 3 can be produced as single elements and can then be inserted into recesses 11 formed in the base body 2. In this case it is also possible to join the sliding shoes 3 to the base body 2 by a form-casting process.

As can also be seen from FIG. 2, however, the sliding shoes 3 may also be integrally formed with the base body 2, in which case they are preferably formed by the fluted or grooved profiles 7 being cast into the surface 4 of the base body 2 or cut down to the depth of the main plane 6, e.g. by milling.

Finally, it should also be mentioned that further constructional modifications of the thrust or journal bearing 1 are possible. It is feasible, for example, that with a constantly uniform given direction of rotation of the machine fitted with the thrust or journal bearing only one group 7' or 7" of fluted or grooved profiles 7 is provided for the delimitation of the sliding shoes 3. The sliding shoes are then in the form of band-like bodies running in the direction of the fluted or grooved profiles 7.

It also appears possible to make use of an arrangement in which one group of fluted or grooved profiles 7 runs in a straight line and radially to base body 2, while the other group of fluted or grooved profiles is located on circular rings disposed concentrically one inside the other. The individual sliding shoes 3 in this case each have a contour in the shape of an annular sector.

The optimal operational behaviour of the thrust or journal bearing 1 is obtained, however, with the embodiment shown in FIG. 1 and described above with reference to FIG. 1.

I claim:

1. In an axial thrust and support bearing for slow-running machines, including a base body (2) having an axis and a periphery, the base body being rotatable about the axis, a plurality of sliding shoes (3) having running surfaces (4) mounted on the base body (2), a plane bearing surface (9) extending perpendicularly of the axis supported by the sliding shoes (3), the sliding shoes (3) being arranged uniformly distributed in the radial direction and in the direction of rotation of the base body (2), each sliding shoe (3) having approximately the shape of a square having sides (3', 3"), wherein adjacent sliding shoes (3) are separated from each other by grooves (7) defined in the base body (2), the improvement comprising the sliding shoes (3) being arranged uniformly distributed on concentric circles ($d_0$, $d_1$, $d_2$ ... $d_x$) extending around the axis in the direction of rotation of the base body (2), the sliding shoes (3) on each of the circles ($d_0$, $d_1$, $d_2$ ... $d_x$) being congruent to each other, the lengths of the sides (3', 3") of the sliding shoes (3) increasing toward the periphery proportionately to the increase of the diameters of the concentric circles ($d_0$, $d_1$, $d_2$ ... $d_x$), the grooves (7) extending in the shape of partial spirals, the grooves (7) being provided in two groups (7', 7"), wherein the grooves of the two groups intersect each other with oppositely directed curvatures.

2. Thrust bearing as in claim 1, wherein the sliding shoes (3) are integrally formed with the base body (2).

3. Thrust bearing as in claim 2, wherein the grooves are configured to be cast in the base body.

4. Thrust bearing as in claim 2, wherein the grooves are configured to be cut in the same body.

5. Thrust bearing as in claim 4, wherein the grooves are cut by milling.

6. Thrust bearing as in claim 1, wherein the grooves (7), of both groups (7' and 7") have the shape of a logarithmic spiral, with the spirals having coinciding shapes, but disposed in a mirror-image arrangement in relation to each other.

7. Thrust bearing as in claim 1, wherein the sliding shoes (3) are inserted individually into the base body (2) and protrude by a specific distance (5) above the surface (6) of it, the sides (3' and 3") of the adjacent sliding shoes (3) delimiting the grooves (7; 7', 7") between themselves and a surface (6) of the base body (2).

8. Thrust bearing as in claim 1 wherein the sliding shoes (3) are joined to the base body (2) by a form-casting process (11).

9. Thrust bearing as in claim 1, wherein the sides (3', 3") of the sliding shoes (3) extend at an angle of 45° to the respective tangent.

10. Thrust bearing as in claim 1, wherein the width of the opening ($r_o$ to $r_x$) of the fluted or grooved profile (7; 7', 7") on the base body (2) or between the sliding shoes (3) in the direction from the axis to the periphery is proportional to the side length of the adjacent sliding shoe (3).

11. Thrust bearing as in claim 1, wherein at least the running surfaces (4) of the sliding shoes (3) are aluminothermically treated or coated.

12. Thrust bearing as in claim 1, wherein the base body is a ring or ring sector.

13. Thrust bearing as in claim 1, wherein a constant number of sliding shoes is located on each concentric circle ($d_0$, $d_1$, $d_2$ ... $d_x$).

14. Thrust bearing as in claim 1, wherein the surface (4) of each sliding shoe (3) has diagonals which are located on one of the concentric circles and on a radius.

15. Thrust bearing as in claim 1, wherein the sides (3', 3") of the sliding shoes (3) extend at all locations at an angle of 45° to the concentric circles, and wherein the radius of curvature of the sides at each location corresponds to the radius from the axis.

* * * * *